(12) United States Patent
Fields et al.

(10) Patent No.: US 11,893,430 B2
(45) Date of Patent: Feb. 6, 2024

(54) PRINTING SYSTEM AND METHOD

(71) Applicant: Juno DTS, LLC., Cincinnati, OH (US)

(72) Inventors: Nicholas Fields, Cincinnati, OH (US);
Dirk Lavoy, Cincinnati, OH (US);
Nicholas Diblabi, Cincinnati, OH (US);
Mike Luttrell, Cincinnati, OH (US);
Robert Wilson, Cincinnati, OH (US)

(73) Assignee: JUNO DTS, LLC, Cincinnati, OH (US)

( * ) Notice: Subject to any disclaimer, the term of this patent is extended or adjusted under 35 U.S.C. 154(b) by 0 days.

(21) Appl. No.: 18/018,210

(22) PCT Filed: Jan. 26, 2022

(86) PCT No.: PCT/US2022/013852
§ 371 (c)(1),
(2) Date: Jan. 26, 2023

(87) PCT Pub. No.: WO2022/164865
PCT Pub. Date: Aug. 4, 2022

(65) Prior Publication Data
US 2023/0214619 A1 Jul. 6, 2023

Related U.S. Application Data

(60) Provisional application No. 63/141,931, filed on Jan. 26, 2021.

(51) Int. Cl.
G06K 15/02 (2006.01)
G06F 3/12 (2006.01)
G06T 1/20 (2006.01)

(52) U.S. Cl.
CPC ....... G06K 15/1807 (2013.01); G06F 3/1208 (2013.01); G06F 3/1242 (2013.01); G06K 15/1878 (2013.01); G06T 1/20 (2013.01)

(58) Field of Classification Search
CPC ............ G06K 15/1807; G06K 15/1878; G06F 3/1208; G06F 3/1242; G06T 1/20
See application file for complete search history.

(56) References Cited

U.S. PATENT DOCUMENTS

2002/0162472 A1* 11/2002 Liguori .................... B41M 3/12
101/487
2003/0011805 A1 1/2003 Yacoub
(Continued)

OTHER PUBLICATIONS

International Search Report and Written Opinion for International Application No. PCT/US2022/013852; dated Apr. 6, 2022; 7 pages.
(Continued)

*Primary Examiner* — Quang N Vo
(74) *Attorney, Agent, or Firm* — Taft Stettinius & Hollister LLP; Derek B. Lavender

(57) ABSTRACT

A method for dynamically modifying an image during a printing process. The method includes executing a digitized pre-process wherein a submitted image is prepared to be a printable image, identifying what marking options are to be applied to the printable image, and executing a real-time feed operation wherein the printable image is modified based on the marking options and applied to a printed article.

28 Claims, 2 Drawing Sheets

(56) References Cited

U.S. PATENT DOCUMENTS

2003/0231330 A1* 12/2003 Westervelt ............ G06F 3/1206
358/1.15
2004/0190057 A1 9/2004 Takahashi
2004/0261074 A1 12/2004 Murakata
2009/0086255 A1 4/2009 Duong

OTHER PUBLICATIONS

Zhang et al. "Hybrid machine learning method to determine the optimal operating process window in aerosol jet 3D printing." ACS applied materials & interfaces 11.19 (2019): 17994-18003. Retrieved on Mar. 22, 2022 (Mar. 22, 2022); 34 Pages.

* cited by examiner

PRINTING SYSTEM AND METHOD

CROSS-REFERENCE TO RELATED DISCLOSURE

The present disclosure is a U.S. National Phase Entry of International Application No. PCT/US2022/013852 filed Jan. 26, 2022 and claims the benefit of U.S. Provisional Application No. 63/141,931 filed on Jan. 26, 2021, the contents of which are hereby incorporated herein in their entirety.

FIELD OF THE DISCLOSURE

The present disclosure relates to a printing system and method, and more specifically to printing system and method that allows dynamic modification of the print image.

BACKGROUND

The printing industry is traditionally fairly limited in accommodating hi through-put dynamic printing. Print images are typically stored on a computer, server, or other similar accessible location where a user may modify the figure in preparation for a printing operation. Conventional systems then implement a main operation wherein the print image is downloaded to a Dynamic Random-Access Memory (hereinafter "DRAM") and setup for a printing operation. The printing operation is then executed by a print head to generate the print image on the printed item.

Conventional systems and methods typically only allow modification of the image at the computer or server and then execute the printing operation. For high through-put printing operations, the image produced at the computer or server is repeatedly printed in subsequent printing operations without substantial change. If the user were to modify the image of a traditional printing system, the entire process would need to be stopped and the image modified at the computer or server prior to resuming. As such, there is a need for a high through-put printing system and method that allows the print image to be dynamically modified without substantial delays.

SUMMARY

One embodiment is a method for using a printing system to print on a printed article. The method includes providing an original image to be printed onto the printed article, transferring the original image to a main operation wherein a separate image layer or other parameter is applied to the original image to generate image setup data, downloading the image setup data to a memory unit, communicating to the memory unit with an IPF process to manipulate the image setup data on the memory unit, and printing a modified image on the printed article with a print head. The image setup data is dynamically modifiable while printing on the printed article.

In one example, the original image is ripped into a CMYK color model before being process to the main operation. In another example, the main operation communicates with a print image operation to generate the image setup data. As part of this example, the print image operation has one or more of the original image, an overlay image, a graphics engine output, and an IPF cached. In another part of this example, the print image operation communicates with an encoder to identify the position of the printed article. In one aspect of this part, when the printed article is properly positioned in the printing system as identified by the encoder, the print image operation communicates with a print head to print a cached combination from the print image operation on the printed article.

Another example of this embodiment includes a serialization process implemented into the memory unit to be applied to the printed image. In part of this example, the serialization process generates serialized data to be applied to the printed image automatically. In another part of this example, the serialization process utilizes blockchain to generate the serialized data. In yet another part of this example, the serialization data is communicated to a graphics engine as part of the serialization process. In another part of this example, a graphics engine implements one or more of line drawing, flood fill, and text drawing to generate the serialization data before the serialization data is sent to the memory unit.

In yet another example of this embodiment, the IPF process modifies any one or more parameters of the image setup data. In part of this example, the one or more parameters of the image setup data comprise one or more of brightness, pixel offset, hue, and saturation.

In another example, the memory unit holds image overlays on separate bit planes or pixel columns. In yet another example, the image setup data has a plurality of pixel columns that are dynamically modifiable while printing on the printed article. In part of this example, when initial column data is sent to the print head, the initial column data contains the image setup data from the main operation as manipulated by the IPF process along with serialized image data from a serialization process. Further, after or while initial column data for the initial pixel column is sent to the print head, first subsequent column data is generated for a first subsequent pixel column and stored in the memory unit. Further still, the first subsequent column data may contain different serialization image data or IPF changes compared to the initial pixel column. After or while the initial pixel column is completed at the print head, the first subsequent column data is sent to the print head containing the image setup data modified for the first subsequent pixel column. After or while the first subsequent column data is sent to the print head, second subsequent column data is generated for a second subsequent pixel column and stored in the memory unit for subsequent printing. The second subsequent column data stored in the memory unit for the second subsequent pixel column contains different serialization image data from a serialization process or IPF changes from the IPF process compared to the first subsequent column data. After or while the first subsequent pixel column is completed by the print head, the second subsequent column data is sent to the print head.

In yet another example of this embodiment, the memory unit memory runs under a faster clock compared to the main operation. In part of this example, the memory unit uses a digital phase lock loop to create a high-speed clock.

Another example utilizes a graphics engine. The graphics engine is an image rendering unit capable of producing dynamic graphics using local pixel manipulation directly to an assigned memory bit plane or pixel column. As part of this example, the graphics engine executes rendering including one or more of line draw, shape draw, object fills overlay order, and text.

In yet another example of this embodiment, the main operation communicates with one or more of a temperature sensor, a DAC, and an EEPROM memory storage embedded into the print head. In another example, the memory unit is managed through a DramOp logic.

Another embodiment of this disclosure is a method for dynamically modifying an image during a printing process. The method includes executing a digitized pre-process wherein a submitted image is prepared to be a printable image, identifying what marking options are to be applied to the printable image, and executing a real-time feed operation wherein the printable image is modified based on the marking options and applied to a printed article.

In one example of this embodiment, the marking options include authentication image modification that embed authentication data on the printed article along with the printable image. In one part of this example, the authentication data is readable by a scanner to authenticate the source of the printed article.

In yet another example, the marking options include a serialization modification that embeds serialization data on the printed article along with the printable image. In one part of this example, the serialization data is unique to each printed article.

In yet another example of this embodiment, the markings options are changeable on a mid-image basis. In yet another example, the marking options comprise auto draw instructions. In one part of this example, the auto draw instructions comprise one or more of lines, fills, and text.

In yet another example of this embodiment, the marking options comprise enhancement overlays. In another example, the marking options may also include a modulation function. In part of this example, the modulation function alters the manner in which individual sub-pixels are combined. In one aspect of this part, the modulation function selectively alters one or more of contrast, brightness, and gamma corrections in real-time during the printing process.

Another example of this embodiment includes executing a distribution feed to deliver ink directly to a printed article surface. In part of this example, the distribution feed includes a distribution link system that provides a distribution to one or more print feed.

Yet another example includes providing dynamic real-time image rendering performed by an on-board graphics engine. In part of this example, the on-board graphics engine produces real-time graphics while creating new images on a print-by-print basis.

In yet another example, the real-time feed has on-board memory. Part of this example includes executing a periodic refresh cycle of the on-board memory between a read stream operation and a write stream operation to ensure that decaying capacitors don't lose charge integrity.

Yet another example includes executing image processing functions as part of the real-time feed operation. In part of this example, the image processing functions comprise real-time image manipulation that generates specialized marking features and color effects. In another part of this example the image processing function alters one or more contrast dynamics, brightness offset, gamma correction, color inversion, and spatial convolution.

In yet another example of this embodiment, the real-time feed comprises a printing outfeed that combines positional information and composite image data generated by image drawing planes into a time-synchronized digital output that drives an ink jetting process directly from at least one print heads.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
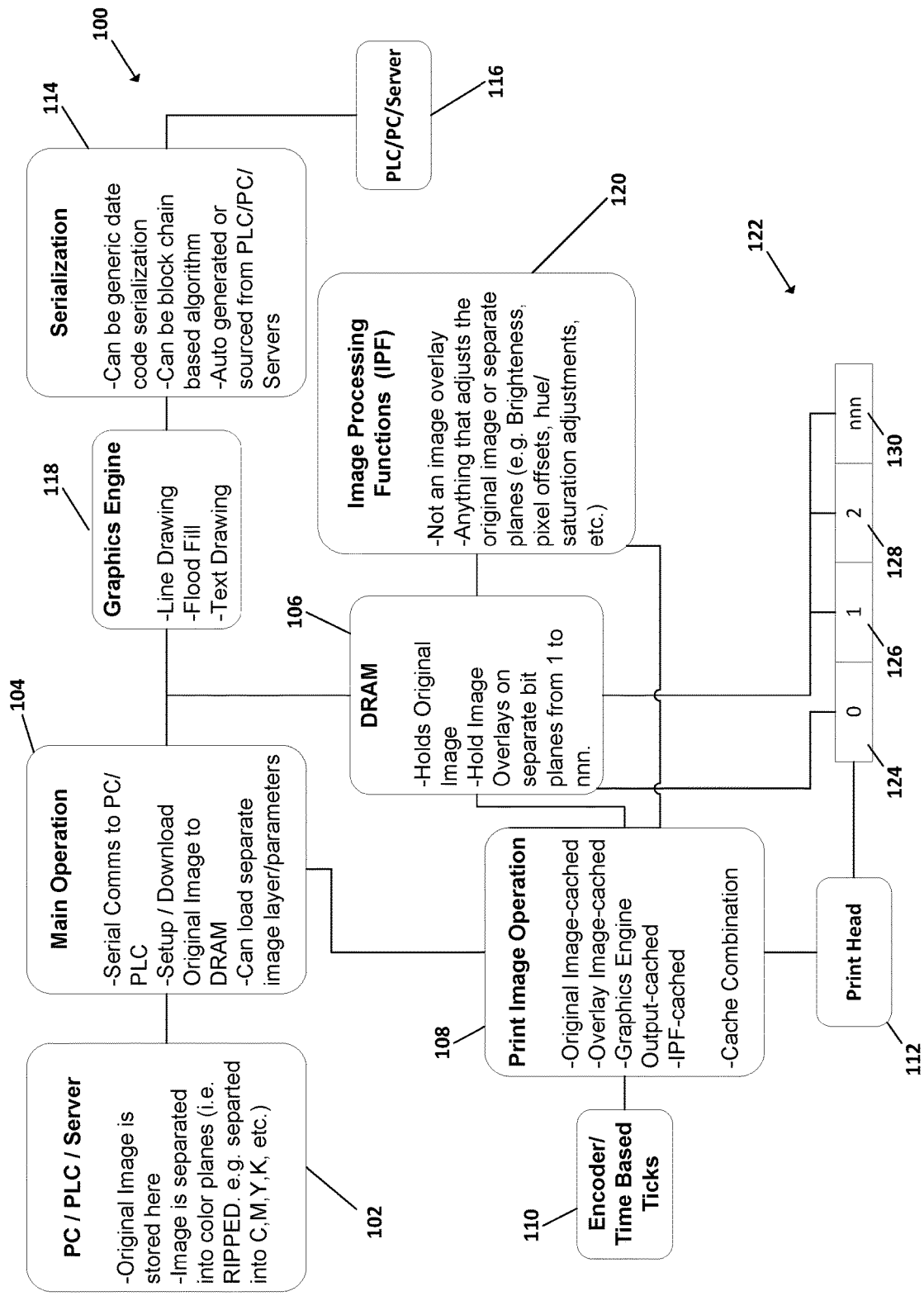
FIG. 1 is a schematic representation of dynamic printing system.
Figure 2:
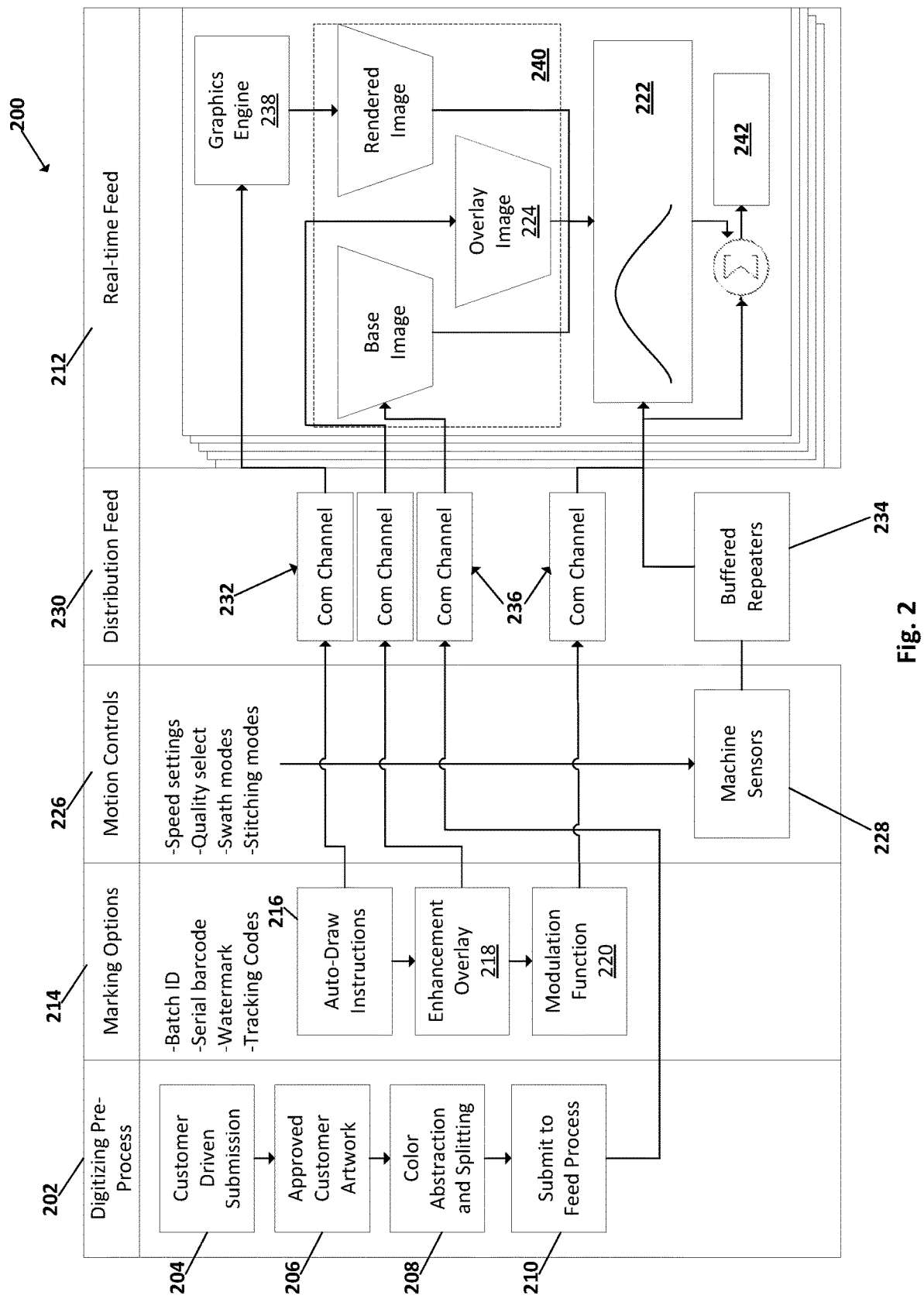
FIG. 2 is another embodiment of a schematic representation of a dynamic printing system.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

The present disclosure relates generally to a dynamic printing system and method that provides for active manipulation of a print image during high through-put printing procedures. More specifically, the present disclosure is directed generally towards providing a system and method for creating a serialized print image as part of a primary printing process for high through-put printing operations such as packaging for goods and the like. As one example, the dynamic printing system and method discussed herein may be implemented while applying an image to an aluminum can or other similar packaging. However, this disclosure contemplates implementing the teachings discussed herein to any printing procedure for packaged goods or the like.

Referring now to FIG. 1, one printing system 100 of this disclosure is illustrated. The printing system 100 initially utilize a computer 102 or the like to store an original image being considered to be printed onto a print article as a printed image. The computer 102 may be any known hardware component capable of storing and manipulating data. The term "computer" as used for computer 102 includes any programmable logic controller, server, or other known computing device or method. The computer 102 may separate the original image into color planes. In other words, the computer 102 may rip the original image to be separated into a cyan, magenta, yellow, and key or black ("CMYK") color model.

After the image is processed by the computer 102, the image data may be transferred to the main operation 104. The main operation 104 may communicate with the computer 102 to acquire the image data for consideration for creating the printed image. The computer 102 may transfer image data with the main operation 104 via any known communication protocol. In one example, the computer 102 utilizes serial communications to transfer data with the main operation 104. However, other communication protocols are also considered herein.

The main operation 104 may setup the image data, in part, to be applied to the printed article and download the setup image data to a memory unit. In one specific example, the memory unit is DRAM 106. However, any known memory unit is also contemplated herein. The main operation 104 may also load a separate image layer or other parameter to the image data. While DRAM is specifically mentioned herein, this disclosure also contemplates using any known image storage bit plane or memory storage hardware and protocol.

In addition to communicating with the DRAM 106, the main operation 104 may also communicate with a print image operation 108. The print image operation 108 may have the original image from the main operation cached, an overlay image cached, a graphics engine output, and an Image Processing Function (hereinafter "IPF") cached among other things. The print image operation 108 may also communicate with an encoder 110 to identify a position of the printed article. When the printed article is properly oriented as identified by the encoder 110, the print image operation 108 may communicate with a print head 112 to print a cached combination from the print image operation 108 on the printed article.

In one aspect of the printing system 100, a serialization process 114 may be implemented into the DRAM 106 to be applied as part of the printed image. The serialization process 114 may be automatically generated based on pre-selected parameters or sourced from a computer 116. The term "computer" for computer 116 may take the same meaning as for the computer 102. Further, in one contemplated example the computer 116 may be the same as computer 102. Alternatively, the computer 116 may be an entirely different hardware component from computer 102. Further still, the serialization process 114 may communicate wirelessly with a remote computer such as a tablet, smartphone, or other portable device.

The serialization process 114 may implement generic date code serialization to generate the serialized data. Alternatively, the serialization process may implement a blockchain based algorithm to generate the serialized data. Further still, the serialization process 114 may implement authentication data that can be read by a scanner or the like to verify the source of a printed article. Regardless of how the serialized data is generated, the serialized data may be communicated to a graphics engine 118 after, or as part of, the serialization process 114. The graphics engine 118 may implement line drawing, flood fill, text drawing, and the like to generate serialization image data before the serialization image data is sent to and stored in the DRAM 106.

The DRAM 106 may also communicate with an IPF process 120 to provide for manipulation of the image data from the main operation 104. The IPF process 120 may modify any of the parameters from the image data such as brightness, pixel offset, hue, saturation, and any other parameter that may alter the way the image data is seen once printed on the printed article.

The DRAM 106 may contain the image data from the main operation 104 which is modified by the IPF process 120 and the serialization process 114 data as an overlay. As one example of this disclosure, the DRAM 106 may hold image overlays on any number of separate bit planes or pixel columns. The modified image data and serialization image data may be presented and cached in the print image operation 108 as discussed herein before being sent to the print head 112 to be applied to the printed article.

In one aspect of this disclosure, the image data associated with each bit plane or pixel column may be dynamically modified while printing on the printed article. For example, a bit plane pixel column sequence 122 may contain any number of pixel columns 130 necessary to generate the entire image. As part of the print process, when an initial pixel column 124 is sent to the print head 112, the initial pixel column 124 may contain the image data from the main operation 104 as manipulated by the IPF process 120 along with any serialized image data from the serialization process 114. When the data from the initial pixel column 124 is sent to the print head 112, data may be generated for a first subsequent pixel column 126 and stored in the DRAM 106 for subsequent printing. The data stored in the DRAM 106 for the first subsequent pixel column 126 may contain different serialization image data or IPF changes compared to the image data from the initial pixel column 124. Once the initial pixel column 124 is completed at the print head 112, the first subsequent pixel column 126 may be sent to the print head 112 containing the image data modified for the first subsequent pixel column 126.

When the data from the first subsequent pixel column 126 is sent to the print head 112, data may be generated for a second subsequent pixel column 128 and stored in the DRAM 106 for subsequent printing. The data stored in the DRAM 106 for the second subsequent pixel column 128 may contain different serialization image data from the serialization process 114 or IPF changes from the IPF process 120 compared to the image data from the first subsequent pixel column 126. Once the first subsequent pixel column 126 is completed at the print head 112, the second subsequent pixel column 128 may be sent to the print head 112 containing the image data modified for the second subsequent pixel column 128. This process may continue for any number of pixel columns 130 necessary to complete any sized image. In one aspect of this disclosure, the print head 112 contains double buffering so that while one bit plane or pixel column is printed the next bit plane or pixel column can be loaded.

In one aspect of this disclosure, DRAM 106 is used to create a large memory space for holding algorithms and images. Implemented with DRAM 106, the print image operation 106 must interleave reads, writes, and automatic refresh cycles. The DRAM 106 memory may run under a faster clock compared to the overall main operation 104 and employs a digital phase lock loop to create the high-speed clock needed to move data rapidly in and out of the memory array.

The graphics engine 118 may be an image rendering unit capable of producing dynamic graphics using local pixel manipulation directly to an assigned memory bit plane or pixel column. Rendering executed by the graphics engine 118 may include line draw, shape draw, object fills overlay order, and text. In one aspect of this disclosure, fonts can be downloaded with scaling attributes to change desired outcomes.

In one embodiment of this disclosure, the main operation 104 is the command center that coordinates between host communications such as the computer 102, DRAM 106, and the print image operation 108. Hardware access to the main operation 104 may include a temperature sensor, Data to Analog Converter ("DAC") operations to control power supplies, electrically erasable programmable read-only memory ("EEPROM") memory storage embedded into the print head, and general operational parameter setup. Serial commands may be received from a host through a system component. The serial commands may be addressed through multiplexers. Further, any known communication protocol and/or BUS type may be implemented as part of this disclosure. For example, Ethernet I/P, Profibus, Fiber, and the like may be utilized as part of the communication network of this disclosure.

The DRAM 106 may be managed through a DramOp logic. Part of the function of DramOp is to continually supply refresh cycles to the DRAM 106 so that it doesn't lose its memory contents over time. There may be two access processes associated with this operation. The first is to read and write directly into the DRAM 106 memory so that images can be uploaded and downloaded by the host. The second is to stream and map data from the DRAM 106 memory space over to the Print Image operations 108 during real-time prints.

Referring now to FIG. 6, one example of a feed operation is illustrated 200. The feed operation may have five independent imaging stations that each deliver a separate function of the feed operation 200. In a digitizing pre-process 202, a customer driven submission 204 may be obtained. The digitizing pre-process 202 may be executed at one of the computers 102, 116 discussed herein or via a separate computer or mobile device. The submission 204 may include all actions and activities for printing services beginning with a customer-driven submission. Requests may be generated either from online website submission forms, or via direct contact with sales personnel. This information may typically include image artwork digital files, quantities of printed articles, required delivery dates, and marking options among others. In one aspect of this disclosure, a cost analysis may be generated based on this submission 204 and the customer may be given an option to accept or decline the terms at this stage.

Another aspect of the pre-process 202 may include a customer artwork approval 206. The approval 206 may include considering the artwork submitted by the customer in an approval process. More specifically, in one example a color analysis process may be executed wherein the artwork image from the submission 204 goes through a rapid verification algorithm which outputs a new image. This new image may reduce color purity, along with implementing color shifts in primary pigments. The resulting image may then be submitted for approval to the customer (via a display, handheld device, or any other component capable of showing an image) upon which the customer accepts, stops, or re-submits different artwork.

The image may then go through a color abstraction and splitting process 208. The process 208 may be executed upon acceptance of the image artwork analysis at the approval 206 phase. At this point, the system requires that the image goes through a "ripping" process in which the traditional Red, Green, and Blue ("RGB") color domain is disassembled and reassembled into the CMYK color domain. While the CMYK color domain is specifically mentioned, this disclosure also considers utilizing other color domains as well. For example, LAB, RGB, and the like color domains may be utilized here as well. Further, the artwork may already be submitted in the final color plane and not required further processing.

Step 208 is called color abstraction and splitting and may be a necessary conversion to provide adequate print images of images that are traditionally created and viewed with cameras and computers, all of which are light sourcing emissions, as opposed to printing and ink lay down materials which are light absorbing reflectors. In other words, a consumer may upload RGB images from their remote device (i.e., smartphone, tablet, etc.) or another color space and want them printed digitally. In this scenario, a CMYK conversion may be executed to make the uploaded image more readily printable. Alternatively, an RGB printer may be implemented and no conversion would be required.

Next may be a submit to feed process 210. The submit to feed process 210 may be the final step in the CMYK abstraction and splitting process. In this operation, each of the colors, which were previously split into "color slices", is then distributed to one or more real-time feed memory array of a real-time feed 212. Each color slice is contained in 5 separate image files, in which the image for that particular color represents a gray scale image. While specific types and numbers of color slices and image files are specifically disclosed herein, this disclosure considers utilizing more or fewer color slices and/or print heads to implement other printing methods. Further, while gray scale methods are discussed, this disclosure also contemplates utilizing binary printing methodology as well.

A next feed operation may be implementing marking options 214. In this feed operation 214, a marking agreement may also be concluded as part of the approval process. More specifically, many options may be available to the customer that include, but are not limited to, batch ID codes, serial barcoding, water marks, tracing codes, and others. This part of the operation 214 represents a real-time marking process that allows markings to be created during the printing process wherein the markings can change on a part-by-part or even mid-image basis. In one aspect of this disclosure, providing the marking options at this phase may allow the original artwork submission to remain substantially untouched.

The marking options 214 may include auto draw instructions 216. The auto draw instructions 216 may provide an option for a customer to graphically render images directly inside the printing outfeed mechanism without external assistance. Using a graphics instruction language, a drawing program is submitted to the digital printing system. This program then cyclically instructs real-time creation of sub-images that are rendered in memory using a unique and independent drawing image plane. At the final stage of the printing operation, the newly rendered image is digitally overlayed atop the original base image using a pixel-by-pixel mapping process, thus leaving the original image un-changed. Drawing instructions may include lines, fills, and text.

The marking options 214 may also have enhancement overlays 218. The overlays 218 include the ability to manipulate sub-images using the enhancement overlay technique. This process provides a means to overlay static images on top of the original base image. Similar to the draw instructions 216, separate drawing image planes are created in memory to hold any number of sub-images that might require a static overlay. These images are typically created outside of the dynamic process using standard graphics tool that work on a PC.

The marking options 214 may also include a modulation function 220. The modulation function 220 works directly in real-time with an image processing function 222. The image processing 222 may be similar to the IPF process 120 discussed herein. In other embodiment, the image processing function 222 is entirely separate from the IPF process 120. Regardless, the image processing function 222 implements modulation operation controls to alter the manner in which individual sub-pixels are combined in a variety of methods. Contrast, brightness, and gamma corrections can be performed in real-time as part of the modulation function 220. Combined with positional feedback from motion controls, these modulation corrections can be expressed as functions of position on the image on a pixel-by-pixel basis. In addition, overlay image 224 memory buffer can double as a dynamic modulation operation that represents algorithm coefficients to created nth-ordered polynomial functions.

A next feed operation may be implementing motion controls 226. Image quality and printing techniques are directly proportional to motion controls and the sensor feedback that drives the synchronizing pulses to the print feed. Printing modes are also affected by the positional feedback. Fast movements and settling time impacts the way in which printing is accomplished. This movement can directly impact the overall production throughput, but it can also influence the methods for which ink is jetted to product surface. Various techniques can be assigned using different modes that control stitching methods and interleaving. These different modes of operation may greatly affect image coverage and lay-down technique. In one aspect of this disclosure, the motion controls 226 may include machine sensors 228, such as encoder 110, that have a high accuracy to ensure great resolution in the motion controls 226.

The feed operation 200 may also include a distribution feed 230. The distribution feed may include five real-time feed stations used to deliver ink directly to a printed article surface. While five real-time feed stations are discussed herein, another contemplated embodiment may have six real-time feed stations as part of the distribution feed 230. Further still, other embodiments may have less than five or more than six real-time feed stations as part of the distribution feed 230.

The distribution feed 230 may also include a distribution link system (hereafter referred to as "D2F" 232) that provides the distribution to each print feed using serial communication delivery techniques. In one aspect of this disclosure, the serial communications delivery techniques may be medium speed but other speeds are contemplated herein as well. The D2F 232 provides the following system services among other: buffered encoder distribution repeaters 234; power distribution to each feed; multiplexed serial communication channels 236 for enhanced image uploads into memory; command distribution for image processing functions; and parametric setup for critical time-based, high-precision delay counters.

The real-time feed 212 may provide dynamic real-time image rendering performed by an on-board graphics engine 238. The on-board graphics engine 238 may be graphics engine discussed herein or a separate graphics engine. Regardless, the graphics engine 238 may be capable of drawing an object in memory space at high speeds. Further, the graphics engine 238 may produce real-time graphics while creating new images on a print-by-print basis. In other words, the graphics engine 238 may provide a processing speed that serial interfaces are incapable of and providing the graphics engine in the real-time feed 212 allows for efficient and fast image processing and modification.

The real-time feed 212 may also have on-board memory 240. The on-board memory 240 may be a medium-speed synchronous dynamic random access memory ("SDRAM") in one embodiment. However, other embodiments may include different types and speeds of on-board memory. Further, the on-board memory 240 may be the DRAM 106 or an entirely separate memory unit. The SDRAM may have unique interface requirements. More specifically, SDRAM is based on charged capacitor arrays that tend to lose charge over time. Accordingly, a periodic refresh cycle may be interleaved between read stream operations and write stream operations to ensure that decaying capacitors don't lose their charge integrity. Additionally, access into the charged capacity array may not be accomplished through direct routes thus requiring a multi-staged row/column access cycle. Accordingly, the present disclosure utilizes SDRAM's that are enhanced with streaming buffers and high-speed clocks, and in some cases, double data rate ("DDR") speeds to ensure that data is rapidly moved in and out of its interface limitations.

The real-time feed 212 may also execute the image processing functions 222. The image processing functions 222 may include real-time image manipulation that generates highly specialized marking features and color effects. Taking advantage of image processing algorithms and functions at the real-time feed 212 phase provides unique optioned for print manufacturing and the corresponding image enhancements compared to conventional methods. More specifically, the image processing functions 222 may include: real-time contrast dynamics; real-time brightness offset; gamma correction; color inversion; and spatial convolution among other things.

The real-time feed 212 may also provide a printing outfeed 242. The printing outfeed 242 may be final printing stage that combines the positional information, as it streams from the motion sensors (i.e., sensors 228), and the composite image data generating by the image drawing planes into a time-synchronized digital output that drives the ink jetting process directly from the print heads. Mechanical alignment and timing coordination are orchestrated in such a manner as to produce the print image onto any surface.

While an exemplary embodiment incorporating the principles of the present application has been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this present application pertains and which fall within the limits of the appended claims.

The invention claimed is:

1. A method for using a printing system to print on a printed article, comprising:
   providing an original image to be printed onto the printed article;
   transferring the original image to a main operation wherein a separate image layer or other parameter is applied to the original image to generate image setup data;
   downloading the image setup data to a memory unit;
   communicating to the memory unit with an IPF process to manipulate the image setup data on the memory unit; and
   printing a modified image on the printed article with a print head;
   wherein, the image setup data is dynamically modifiable while printing on the printed article.

2. The method of claim 1, wherein the original image is ripped into a CMYK color model before being process to the main operation.

3. The method of claim 1, wherein the main operation communicates with a print image operation to generate the image setup data.

4. The method of claim 3, wherein the print image operation has one or more of the original image, an overlay image, a graphics engine output, and an IPF cached.

5. The method of claim 3, wherein the print image operation communicates with an encoder to identify the position of the printed article.

6. The method of claim 5, wherein, when the printed article is properly positioned in the printing system as identified by the encoder, the print image operation communicates with a print head to print a cached combination from the print image operation on the printed article.

7. The method of claim 1, wherein, a serialization process is implemented into the memory unit to be applied to the printed image.

8. The method of claim 7, wherein the serialization process generates serialized data to be applied to the printed image automatically.

9. The method of claim 8, wherein the serialization process utilizes blockchain to generate the serialized data.

10. The method of claim 8, wherein the serialization data is communicated to a graphics engine as part of the serialization process.

11. The method of claim 8, wherein a graphics engine implements one or more of line drawing, flood fill, and text drawing to generate the serialization data before the serialization data is sent to the memory unit.

12. The method of claim 1, wherein the IPF process modifies any one or more parameters of the image setup data.

13. The method of claim 12, wherein the one or more parameters of the image setup data comprise one or more of brightness, pixel offset, hue, and saturation.

14. The method of claim 1, wherein the memory unit holds image overlays on separate bit planes or pixel columns.

15. The method of claim 1, wherein the image setup data has a plurality of pixel columns that are dynamically modifiable while printing on the printed article.

16. The method of claim 15, wherein when initial column data is sent to the print head, the initial column data contains the image setup data from the main operation as manipulated by the IPF process along with serialized image data from a serialization process.

17. The method of claim 16, wherein after or while initial column data for the initial pixel column is sent to the print head, first subsequent column data is generated for a first subsequent pixel column and stored in the memory unit.

18. The method of claim 17, wherein, the first subsequent column data contains different serialization image data or IPF changes compared to the initial pixel column.

19. The method of claim 18, wherein after or while the initial pixel column is completed at the print head, the first subsequent column data is sent to the print head containing the image setup data modified for the first subsequent pixel column.

20. The method of claim 19, wherein after or while the first subsequent column data is sent to the print head, second subsequent column data is generated for a second subsequent pixel column and stored in the memory unit for subsequent printing.

21. The method of claim 20, wherein the second subsequent column data stored in the memory unit for the second subsequent pixel column contains different serialization image data from a serialization process or IPF changes from the IPF process compared to the first subsequent column data.

22. The method of claim 21, wherein after or while the first subsequent pixel column is completed by the print head, the second subsequent column data is sent to the print head.

23. The method of claim 1, wherein the memory unit memory runs under a faster clock compared to the main operation.

24. The method of claim 23, wherein the memory unit uses a digital phase lock loop to create a high-speed clock.

25. The method of claim 4, wherein the graphics engine is an image rendering unit capable of producing dynamic graphics using local pixel manipulation directly to an assigned memory bit plane or pixel column.

26. The method of claim 25, wherein the graphics engine executes rendering including one or more of line draw, shape draw, object fills overlay order, and text.

27. The method of claim 1, wherein the main operation communicates with one or more of a temperature sensor, a DAC, and an EEPROM memory storage embedded into the print head.

28. The method of claim 1, wherein, the memory unit is managed through a DramOp logic.

\* \* \* \* \*